(12) United States Patent
Corder (10) Patent No.: US 7,069,447 B1
(45) Date of Patent: Jun. 27, 2006

(54) APPARATUS AND METHOD FOR SECURE DATA STORAGE

(76) Inventor: Rodney Joe Corder, 10449 Salinas River Cir., Fountain Valley, CA (US) 92708

( * ) Notice: Subject to any disclaimer, the term of this patent is extended or adjusted under 35 U.S.C. 154(b) by 845 days.

(21) Appl. No.: 10/143,288

(22) Filed: May 10, 2002

Related U.S. Application Data (60) Provisional application No. 60/290,231, filed on May 11, 2001.

(51) Int. Cl.
*H04L 9/00* (2006.01)
*H04L 9/32* (2006.01)

(52) U.S. Cl. .............. 713/189; 713/168; 713/193; 713/182

(58) Field of Classification Search .......... 713/168, 713/182, 185–186, 189, 192–194, 150; 380/200, 380/277
See application file for complete search history.

(56) References Cited

U.S. PATENT DOCUMENTS

| 5,533,125 | A | | 7/1996 | Bensimon et al. |
| 5,623,637 | A | | 4/1997 | Jones et al. |
| 5,712,912 | A | * | 1/1998 | Tomko et al. ............... 713/186 |
| 5,748,744 | A | | 5/1998 | Levy et al. |
| 5,845,066 | A | | 12/1998 | Fukuzumi |
| 6,581,161 | B1 | * | 6/2003 | Byford ....................... 713/182 |
| 6,751,733 | B1 | * | 6/2004 | Nakamura et al. .......... 713/182 |
| 6,892,301 | B1 | * | 5/2005 | Hansmann et al. ......... 713/172 |

* cited by examiner

*Primary Examiner*—Hosuk Song (57) ABSTRACT

A computer data storage device for storing confidential data incorporating data encryption and user authentication. The user authentication supports multiple distinct users each having their own PIN code or password and distinct access rights. Attempts to attack the data by multiple unsuccessful login attempts is detected during user authentication and users are locked out until the card is reactivated. A special supervisory Security Officer ID and PIN code or password is provided to allow for the customization and configuration of the device as well as administering the user ID's and their access rights.

20 Claims, 10 Drawing Sheets

PRIOR ART

APPARATUS AND METHOD FOR SECURE DATA STORAGE

This application claims the benefit of U.S. Provisional Application No. 60/290,231, filed May 11, 2001, the disclosure of which is hereby incorporated herein by reference.

FIELD OF THE INVENTION

This invention relates generally to computer data storage systems, and more specifically to apparatus and method for storing and communicating private data.

BACKGROUND OF THE INVENTION

Personal computer systems, especially portable computers such as laptop, notebook and handheld computer systems increasingly are called upon to store and retrieve data that is confidential to either the user or the organization the user represents. This can leave the data vulnerable to theft and misuse by competitors or other malicious entities. Several methods have been used to attempt to keep this data private including user passwords, encryption programs and dedicated equipment. Each of these current approaches have limitations which are addressed in this invention.

Most sophisticated modern operating systems require the user to log-in the system before use. This login attempts to authenticate the user and then applies certain access rights to the user for data that is stored on the system. The drawback of this approach is that the data in the mass storage device (such as a hard disk) is stored as plaintext. If the mass storage device were removed from the system and placed in another system, the contents of the mass storage device could be accessed and the data compromised. An example of this is the login requirement of Microsoft Windows NT.

Encryption programs on the computer, such as the Invincible Disk product from Invincible Data Systems, use the host processor to encrypt and decrypt data going between the operating system and the mass storage device. This approach protects the data on the mass storage device itself by encrypting it before the data is stored. This approach suffers from several drawbacks against malicious or focused attacks on the system. First, the encryption and decryption keys must be stored somewhere in the computer system itself. For most PCs, this means that the keys must be stored in the mass storage media. Since the keys are stored along with the data, it means that everything the attacker needs to compromise the data is stored on the mass storage media and can be taken offsite and attacked. The second problem is that any program running on the PC is subject to attacks by viruses which would seek to steal keys or incapacitate or neutralize the encryption, or by decompilation or disassembly by a sophisticated attacker seeking to extract universal key and algorithm information. Either way software represents a risk to the integrity and confidentiality of the data.

Dedicated equipment is seen as the best way to keep the confidential data from becoming vulnerable to attack, and several approaches have been taken to do this. Bensimon et al. disclosed a "Removable Computer Security Device" in U.S. Pat. No. 5,533,125. This device requires a password to be authenticated on the device before read or write access can be made to the device. Unfortunately, it also teaches that the data, as well as the passwords are still stored as plaintext on the mass storage media itself. This leaves the data vulnerable because it can still be accessed directly from the mass storage media by a sophisticated attacker.

Levy et al. disclosed a "Secure Mass Storage System for Computers" in U.S. Pat. No. 5,748,744. This disclosure teaches the addition of a crypto engine on the mass storage device. This device requires command set extensions to the operating system for providing the passwords to the mass storage system, as well as storing the encryption keys in the storage medium itself. While the data in the storage media is encrypted, the keys being stored in the media as well leave the media open to attack because the key material can be extracted directly from the mass storage media. As well, the user supplied key is sent from the CPU system to the mass storage system through one or more programs. These programs as well as the interface between the CPU system and the mass storage system are subject to attacks from virus programs or by direct observation of the data traveling over the interface.

Fukuzumi disclosed a "Security System Apparatus for a Memory Card and a Memory Card Employed Therefore" in U.S. Pat. No. 5,845,066. This disclosure teaches a PCMCIA memory card where the password is stored encrypted on the card. The host computer is required to take the " . . . coded enciphering control data which, when decoded, reveals a predetermined password . . . " The predetermined password is revealed by decoding the enciphering control data using the host information processing device (computer) and presented to the access control section of the memory card. This invention teaches enabling access to the contents of the memory card, not to encrypt or scramble the data on the card. Again, this approach requires a program on the computer to decode the coded data to reveal the password, which is sent back from the computer to the access control section. This invention does not address the confidentiality of the data stored in the memory of the card itself, nor any attacks on the host computer to steal the password information.

Jones et al. disclosed an "Encrypted Data Storage Card Including Smartcard Integrated Circuit for Storing an Access Password and Encryption Keys" in U.S. Pat. No. 5,623,657. This disclosure teaches a memory card with an integrated encrypt/decrypt function and a smartcard IC used to securely store the user passwords and encryption keys required for operation. While this device addresses the requirement to store data on the card in an encrypted format it still requires the host computer to provide the password. Additionally, the approach disclosed restricts a single password per memory partition, not supporting the use of multiple users with distinct passwords for the same partition.

BRIEF SUMMARY OF THE INVENTION

The present invention overcomes the shortcomings and deficiencies of the prior art by providing a secure mass storage system that encrypts and decrypts data on the fly and contains an on board user authentication mechanism which supports multiple users. The on board user authentication mechanism constitutes an improvement over prior art by eliminating the requirement for host computer intervention and It is an object of the invention that any PIN codes, passwords or Key information is not stored in the mass storage media to inhibit direct attacks on the mass storage media to recover PIN codes, passwords or Key information.

It is a further object of the invention that user authentication be local to the secure data storage device preventing the external transfer of PIN codes, passwords or Key information outside of the secure data storage device.

It is a further object of the invention that multiple users be supported by the user authentication allowing unique PIN codes or passwords for each user as well as distinct access privileges by user.

It is a further object of the invention that the user authentication mechanism keep track of unsuccessful attempts to log into the secure data storage device and lock-out users not having correct PIN codes or passwords.

It is a further object of the invention that the secure data storage device perform all of its user authentication and data cryptographic functions completely independent of the host computer platform, operating system or applications so as not to be dependent on any host computer code which could be subject to attack or compromise. This allows the secure data storage device to operate with a variety of existing legacy devices such as notebook computers, handheld computers, palm-top computers and digital audio and video recording devices such as voice recorders and cameras.

It is a further object of the invention to provide control and status requests by examining the contents of one or more sectors, or the sequence of access of one or more sectors to differentiate between data oriented toward the mass storage media and PIN codes, passwords or commands oriented toward the user authentication unit.

It is a further object of the invention to provide a mechanism whereby the processing power of the host computer can be utilized to support compute intensive user authentication mechanisms while still providing the user authentication mechanism within the secure data storage device.

It is a further object of the invention to provide emulation capabilities between the mass storage controller and the mass storage media itself to allow for a larger mass storage media than the mass storage controller is otherwise capable of supporting.

These and other features and advantages of the present invention will become more apparent by considering the following detailed description of a preferred embodiment of the invention.

DETAILED DESCRIPTION OF THE INVENTION

Figure 1:
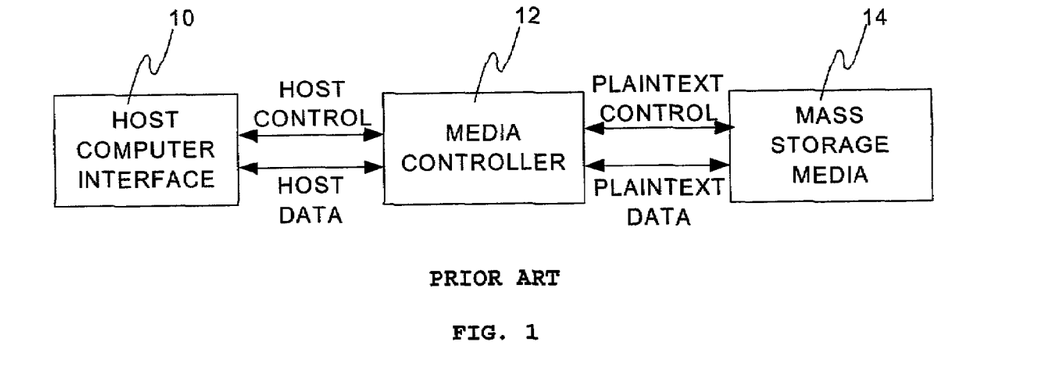
FIG. 1 is a block diagram of a typical prior art mass storage device.

Referring to FIG. 1, a mass storage device according to the prior art consists of a host computer interface 10 receiving and transmitting control information and data from a host computer. The host computer interface 10 communicates the host control and host data from the host computer to the media controller 12. The media controller 12 translates the host control and host data into a form that the mass storage media 14 can use to store and retrieve the data. In the prior art mass storage device, data is stored in the mass storage media 14 in a manner that makes it accessible to any host computer through the host computer interface 10. Although the media controller 12 may format and encode the data for storage on the mass storage media 14, the encoding is simple and well known. Data that was written by the host computer may be extracted directly from the mass storage media 14 itself and reconstructed to determine the original data stored. This makes the data susceptible to being extracted directly from the mass storage media 14 regardless of any password requirement by the media controller 12.

Figure 2:
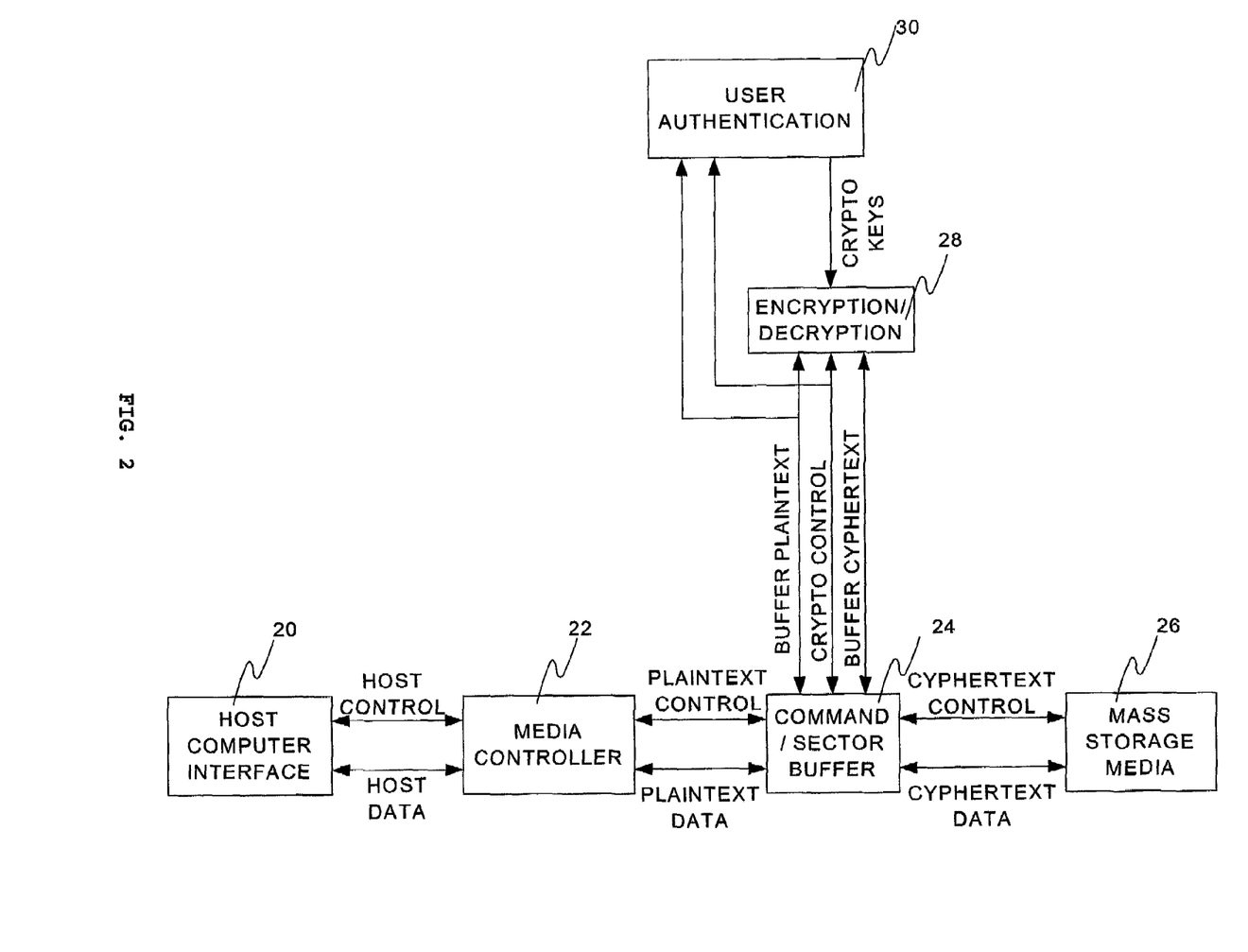
FIG. 2 is a block diagram of the present invention.

FIG. 2 shows a block diagram of a secure data storage device incorporating the present invention. For a typical mass storage write procedure, the host computer interface 20 receives host control and host data from the host computer. The host computer interface 20 communicates the host control and host data from the host computer to the media controller 22. The host computer interface 20 may be one of a number of standard or custom processor interfaces including ISA, PCI, PCMCIA, Compact Flash, ATA or IDE. The host computer interface 20 may alternatively be one of a number of a peripheral bus interfaces including USB (Universal Serial Bus), Fire Wire (IEEE 1394) or SCSI. The media controller translates the host control and host data into a form that the mass storage media 26 can use to store and retrieve the data. This form is provided as the plaintext control and plaintext data.

The command/sector buffer 24 receives the plaintext control and plaintext data intended for the mass storage media 26. The command/sector buffer 24 separates the plaintext control from the plaintext data, stores the plaintext control and provides the plaintext data to the encryption/decryption 28 unit. Any modification required to the plaintext control to create the cyphertext control is performed in the command/sector buffer 24. The encryption/decryption 28 applies a cryptographic function such as DES (the US Data Encryption Standard) to the buffer plaintext data based on crypto keys provided by the user authentication 30 unit. The buffer cyphertext data is provided back to the command/sector buffer 24 and rejoins the stored cyphertext control. The cyphertext control and cyphertext data are provided to the mass storage media 26. The mass storage media 26 may be any of a number of bulk data storage devices including linear flash memories (such as the AMD Am29LV033C), NAND-type flash memories (such as the Toshiba TH58100FT) as well as magnetic media such as a rotating disk or magnetic tape. The mass storage media 26 uses the cyphertext control to properly store the cyphertext data for later access. In this manner, only cyphertext (encrypted) data is stored in the mass storage media 26, making the data safe against being extracted directly from the mass storage media 26 without the proper decryption key.

During a mass storage read procedure, the host computer interface 20 receives commands from the host computer to retrieve data from the mass storage media 26. The host computer interface 20 provides this host control information to the media controller 22. The media controller translates the host control into the plaintext control, a form that the mass storage media 26 can use to retrieve the data. The command/sector buffer 24 decodes the plaintext control and performs any modification required to create the cyphertext control. The mass storage media 26 uses the cyphertext control to access the stored cyphertext data. The mass storage media 26 provides the cyphertext data as well as acknowledgement cyphertext control information to the command/sector buffer 24 which provides the buffer cyphertext data to the encryption/decryption 28 unit and stores the cyphertext control information. The encryption/decryption 28 applies a cryptographic function to decrypt the data according to crypto keys provided by the user authentication 30, and provides buffer plaintext data to the command/sector buffer 24. The command/sector buffer rejoins the plaintext data with the plaintext control and provides it to the media controller 22, which converts it back into a form the host computer can understand and provides the host data and host control information to the host computer using the host computer interface 20.

The user authentication 30 unit directly accepts personal identification input from the user of the secure data storage device in order to determine if the user is allowed to access the secure data storage device, and if so, what privileges the user is permitted. The user authentication 30 unit can be any of a number of input devices including PIN (Personal Identification Number), keypad, fingerprint sensor with feature extraction and matching or a smart card interface for retrieving user information from a standard ISO smart-card. The user authentication 30 unit accepts the personal identification input from the user and authenticates the user to internally stored parameters. If the user is authenticated the user authentication 30 unit provides the crypto keys to the encryption/decryption 28 unit for use by the cryptographic function to encrypt and decrypt data provided by the command/sector buffer 24.

The implementation according to FIG. 2 has the advantage that the command/sector buffer 24 need only decode the primitive control information required by the mass storage media 26 instead of decoding the more complex control information provided by the host computer. It also can use off-the-shelf media controllers such as the Cirrus Logic CL-SH7660 Advanced Architecture ATA-66 Disk Controller, or a Toshiba TC58NC353F High Capacity Flash Disk Controller, eliminating an extensive design and qualification cycle. Additionally, since the command/sector buffer 24 has direct access to the plaintext control from the media controller 22 various mechanisms can be employed to provide physical access restrictions to the mass storage media 26 under operational roles assigned by the user authentication 30. Such restrictions could include read and write access restrictions as well as the use of different keys for different partitions of the media.

Figure 3:
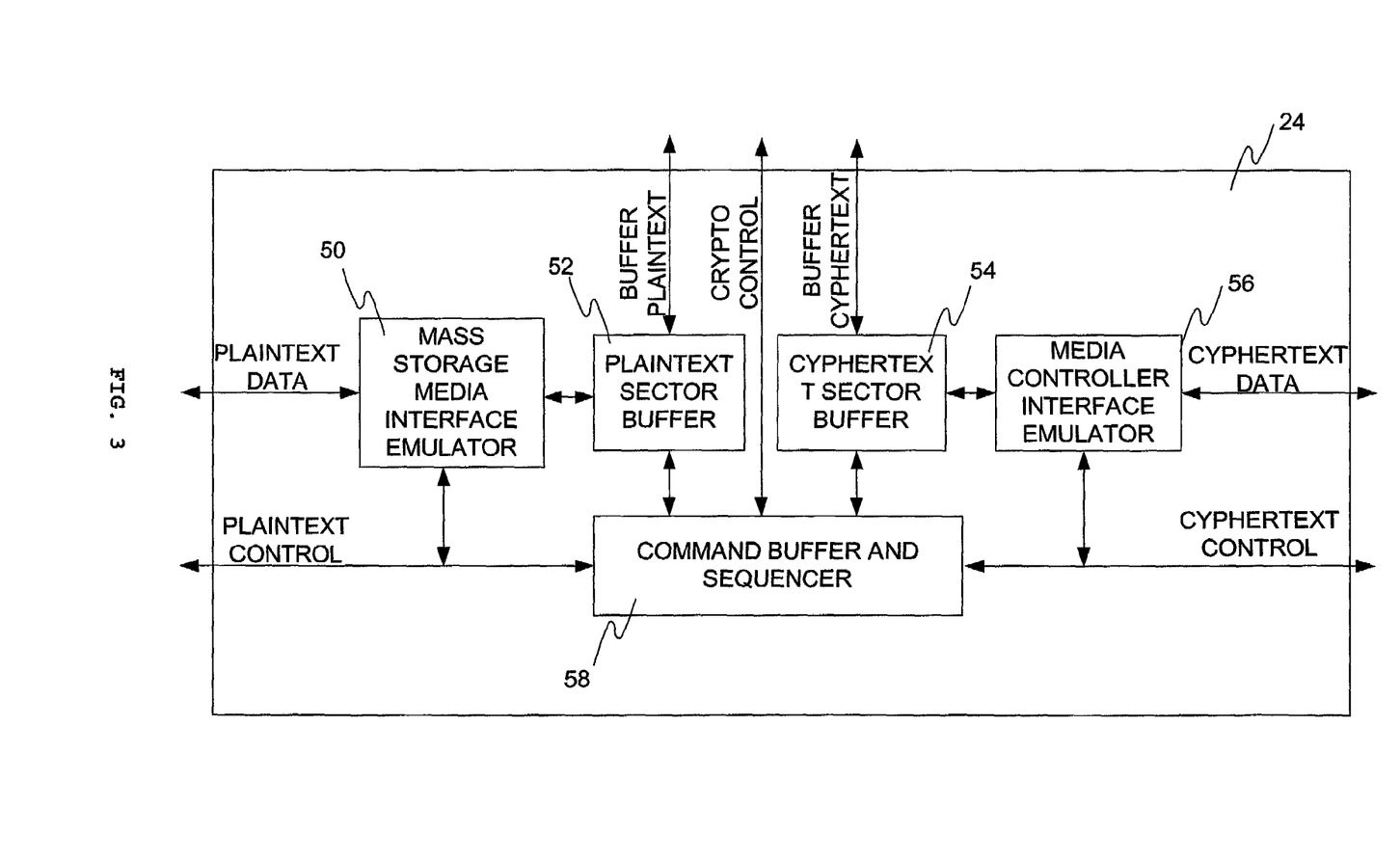
FIG. 3 is a block diagram of the command/sector buffer.

The command/sector buffer 24 is further detailed in FIG. 3. During a data write to the mass storage media 26, the mass storage media interface emulator 50 receives plaintext control and plaintext data from the media controller 22. The mass storage media interface emulator 50 emulates the functionality of the electrical interface of the mass storage media 26 and provides similar responses as the mass storage media 26 in response to plaintext control from the media controller 22. This emulation fulfils the expectation of the media controller 22 for operation. The mass storage media interface emulator 50 uses the plaintext control to load plaintext data into the plaintext sector buffer 52.

The command buffer and sequencer 58 receives plaintext control input and interprets it according to the tasks required by the media controller 22. After the mass storage media interface emulator 50 loads the plaintext sector buffer 52 the command buffer and sequencer 58 signals the encryption/decryption 28 unit to accept buffer plaintext for encryption using the crypto control signaling. After encrypting the buffer plaintext the encryption/decryption 28 unit provides buffer cyphertext for storage in the cyphertext sector buffer 54. Communication between the command buffer and sequencer 58 and the encryption/decryption 28 unit take place over the crypto control.

After the cyphertext sector buffer 54 has been loaded with the buffer cyphertext from the encryption/decryption 28 unit, the command buffer and sequencer 58 initiates a transfer of the data in the cyphertext sector buffer 54 to the mass storage media 26 through the media controller interface emulator 56. The media controller interface emulator 56 emulates the control and data functionality of the media controller 22. This emulation appears to the mass storage media 26 as if the media controller 22 was directly controlling the operation. The media controller interface emulator 56 provides the cyphertext data and cyphertext control to the mass storage media 26 for storage. When the operation is complete, the command buffer and sequencer 58 signals the mass storage media interface emulator 50 to indicate to the media controller 22 the operation has completed, in the same manner the mass storage media 26 would have if it had been directly connected to the media controller 22. In this manner, the command/sector buffer 24 appears to the media controller 22 as if it were the mass storage media 26, and the command/sector buffer 24 appears to the mass storage media 26 as if it were the media controller 22. This emulation makes it possible for both the media controller 22 and the mass storage media 26 to operate normally with only a small latency for data encryption by the encryption/decryption 28 unit.

During a data read procedure from the mass storage media 26, the mass storage media interface emulator 50 receives plaintext control from the media controller 22. The command buffer and sequencer 58 interprets the plaintext control and provides cyphertext control to the mass storage media 26. The mass storage media 26 provides the cyphertext data and appropriate cyphertext control responses to the media controller interface emulator 56 as well as the command buffer and sequencer 58. The media controller interface emulator 56 interprets the cyphertext control and cyphertext data and provides cyphertext data to the cyphertext sector buffer 54.

When the transfer has completed, the command buffer and sequencer 58 signals the encryption/decryption 28 unit to accept buffer cyphertext for decryption using the crypto control signaling. After decrypting the buffer cyphertext the encryption/decryption 28 unit provides buffer plaintext for storage in the plaintext sector buffer 52.

After the plaintext sector buffer 52 has been loaded with the buffer plaintext from the encryption/decryption 28 unit, the command buffer and sequencer 58 initiates a transfer of the data in the plaintext sector buffer 52 to the media controller 22 through the mass storage media interface emulator 50. The mass storage media interface emulator 50 provides the plaintext data and plaintext control to the media controller 22 in response to the data read procedure.

Depending on the levels of security required to prevent accidental leakage of plaintext data into the mass storage media, the plaintext sector buffer 52 and the cyphertext sector buffer 54 could be implemented as one physical RAM memory where plaintext data is read from and cyphertext data is written to or overwritten in the same memory for data writes to the mass storage media 26. For data reads from the mass storage media 26 cyphertext data is read from and plaintext data is written to or overwritten in the same memory. Access to this single memory and routing of the data is provided by the command buffer and sequencer 58. Joining these two logical buffers into one physical memory reduces the size of the implementation at the expense of accidental leakage of plaintext data.

Figure 4:
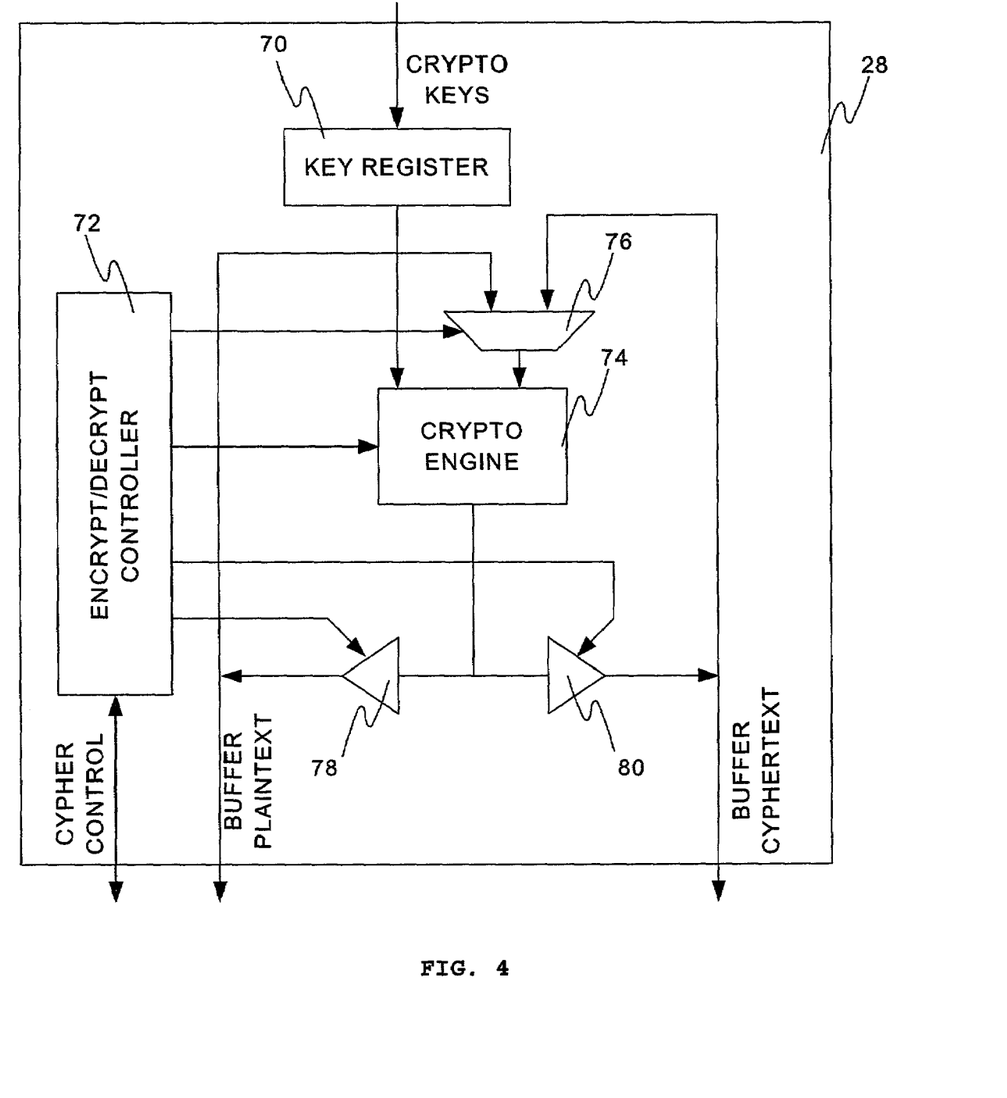
FIG. 4 is a block diagram of the encryption/decryption unit.

FIG. 4 is a block diagram of the encryption/decryption 28 unit. The key register 70 receives crypto key information from the user authentication 30 unit. This key information is provided to the crypto engine 74 for use in encrypting the buffer plaintext data and decrypting the buffer cyphertext data. A multiplexer 76 selects which of the buffer plaintext data or buffer cyphertext data will be provided to the crypto engine 74 for processing. The crypto engine 74 performs a cryptographic function on the data supplied by the multiplexer 76. The cryptographic function can be any of a number of encryption/decryption functions such as DES, 3-DES, IDEA or Skipjack. For systems requiring faster access the cryptographic function could be simple data scrambling to reduce latency in the cryptographic function.

The encrypt/decrypt controller 72 receives cipher control from the command/sector buffer and provides status back. The encrypt/decrypt controller 72 performs functions such as controlling the multiplexer 76 to select the input data for the crypto engine 74, initializing and sequencing the crypto engine 74, and controlling the buffer plaintext bus driver 78 and the buffer cyphertext bus driver 80.

After performing a cryptographic function on the data, the crypto engine 74 provides the modified data to the buffer plaintext bus driver 78 and the buffer cyphertext bus driver 80. Under control of the encrypt/decrypt controller 72, one of the buffer plaintext bus driver 78 or the buffer cyphertext bus driver 80, is activated to provide the modified data to the appropriate bus and then to the command/sector buffer 24.

Figure 5:
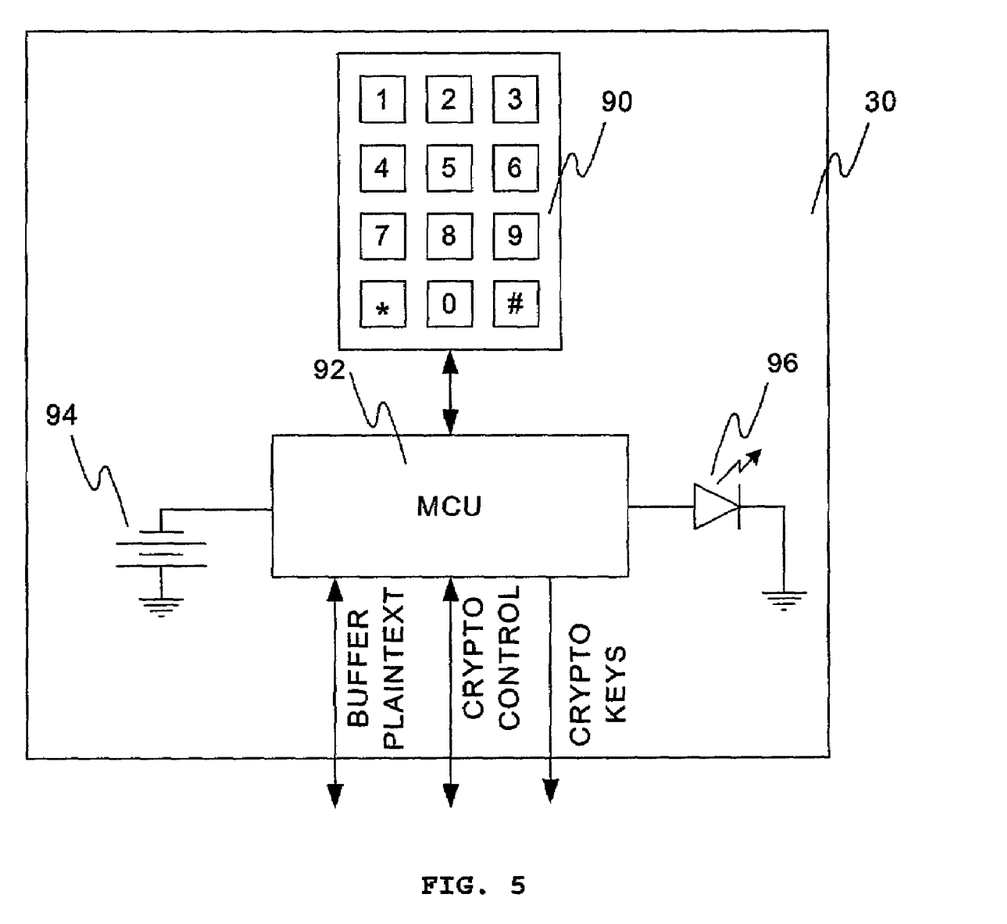
FIG. 5 is a block diagram of the user authentication unit.

FIG. 5 is a block diagram of the user authentication 30 unit. This unit is managed by an MCU 92 (microcontroller) under a fixed program. The MCU 92 controls and receives input from a keypad 90 for the input of a user ID and PIN code or password. The user ID and he user PIN code or password are predetermined sequences of digits or characters known by the user and used to enable operation of the secure data storage device. After the user input of a proper user ID and PIN code or password in the keypad 90, the MCU 92 compares the PIN code or password to the stored PIN code or password for the given user ID and determines the proper crypto keys to provide to the encryption decryption 28 unit. The user ID and PIN code or password is preferably stored on the MCU either in a non-volatile memory such as EEPROM or flash, or in a battery-backed volatile memory such as RAM. If the user ID, PIN code or password, user privileges or encryption keys are not stored on-chip, they may be stored off-chip but must be encrypted to prevent physical probing of the circuit board to determine the encryption keys or user ID and PIN codes or passwords. An LED 96 serves as a simple feedback mechanism to the user to indicate the operational state of the user authentication 30. A battery 94 is provided to allow the MCU 92 to operate in the event that power is not yet applied to the secure data storage device. This allows the user to enter a PIN code or password and activate the secure data storage device before it is plugged in. This capability supports user login and loading of the appropriate crypto key information on non-computer systems such as handheld computers, digital cameras or digital voice recorders. Because all of the user authentication is performed on the secure data storage device, there is no need for additional programs before using the secure data storage device.

The user authentication 30 unit is also capable of accepting crypto control from the command/sector buffer 24. Upon the detection of certain events, the command/sector buffer 24 may provide PIN codes, passwords or other information to the MCU 92 for operation within a computer system. In this manner an application running on the host computer can provide the PIN code or password information to the MCU 92 for user authentication and the provision of crypto keys to the encryption/decryption 28 unit.

A mechanism for providing information to the user authentication 30 unit involves detecting accesses to the boot-block sector of the mass storage media 26. The boot block sector is the first addressable block of the mass storage media 26 and, in the case of a PC, always begins with a known 80×86 instruction which results in the bytes 0xEB and 0x3C being the first two bytes of the boot block. The command buffer and sequencer 58 of the command/sector buffer 24 detects writes to the boot knowing the physical address of the boot block in the mass storage media 26. If a plaintext sector buffer 52 is loaded with plaintext data destined for the boot block sector of the mass storage media 26, the command buffer and sequencer 58 determines if the first two bytes are the same as for a valid boot block. If so, the command buffer and sequencer 58 will process the block normally. If the first two bytes are not correct for a boot block, the command buffer and sequencer 58 provides the contents of the buffer to the MCU 92 of the user authentication 30 unit. The MCU 92 then determines what type of information is being presented in the buffer and operates on it accordingly. Different types of information provided include a user PIN code or password, a request to set a PIN code or password, a request to set a crypto key or a request to zeroize or clear all PIN codes, passwords and keys. Additionally, since the boot sector is always examined, the command buffer and sequencer 58 may optionally always prohibit writes to the boot sector and operate as a hardware virus barrier inhibiting boot-sector viruses independent of the host system BIOS or operating system. In addition to the simple detection of the boot block sector, the command buffer and sequencer 58 can detect a the access to a predefined sequence of sectors in order to identify a subsequent request or command from the host computer.

Figure 6:
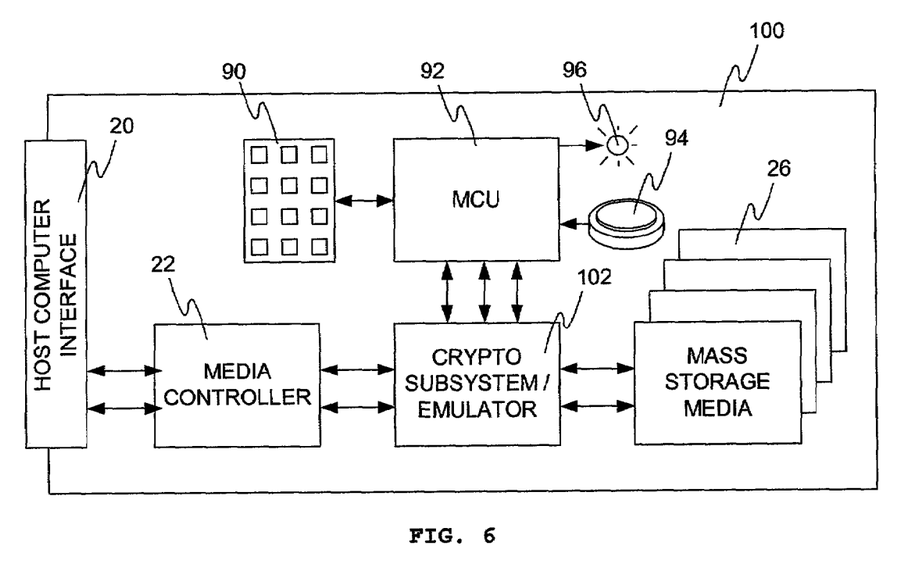
FIG. 6 is a block diagram of a PC Card incorporating the invention.

FIG. 6 shows a block diagram of a PCMCIA card 100 for secure storage data storage. The invention is housed in a Type-II PCMCIA enclosure and the host computer interface 20 is a standard PCMCIA 68-pin connector. Single support cards such as PCMCIA or Compact Flash may be connected to the host computer through an externally accessible connector of the host computer. This configuration allows the secure data storage device to be used in existing industry-standard notebook computers. The media controller 22 is a Toshiba TC58NC353F High Capacity Flash Disk Controller which controls a number of NAND Flash memory devices. The mass storage media 26 is an array of one or more Toshiba TC58512 512 Mb serial NAND flash devices. The media controller 22 provides an ATA compatible interface to the host computer through the host computer interface 20 and provides control, sequencing and decoding for the various devices in the mass storage media 26. The media controller 22 interprets commands from the host computer through a standard ATA task-file interface. Although some of these commands are primitive, many are complex, requiring multiple accesses of data from the mass storage media 26. The media controller 22 also performs flash memory related tasks transparent to the host computer such as wear-leveling, bad block mapping and block erasing.

The user PIN codes or passwords are entered onto a keypad 90 which is preferably a low-profile or membrane keypad in order to keep the overall height of the card to within the PCMCIA specification. The LED 96 is preferably a small green surface-mount LED which illuminates through an aperture on the keypad 90. The battery 94 for the MCU 92 is preferably a small lithium coin cell of type BR2320 or other type. It may optionally be a rechargeable cell which would be charged when the PCMCIA card 100 was plugged into and operating in a notebook or other computer. The MCU 92 is preferably an Atmel AT90LS8535 8-bit RISC microcontroller. This device contains 8 KB of Flash program memory, 512 B of SRAM for data storage and 512 B of EEPROM non-volatile memory. This allows the user authentication program, secret keys and PIN codes or passwords to be stored internal to the chip. The device also has a Power Down mode that allows it to consume less than 1 micro-amp of current while being able to start operation when a key is pressed on the keypad 90.

The crypto subsystem/emulator 102 is implemented as an ASIC device which combines the functionality of the command/sector buffer 24 and the encryption/decryption 28 unit in the manner described above. The mass storage media interface emulator 50 for the crypto subsystem emulator 102 presents an interface to the media controller 22 that is identical to the serial NAND Flash devices making up the mass storage media 26. The serial NAND Flash devices use a RDY/-BUSY signal to indicate to the media controller 22 that the device is ready to accept new commands or there is data available. The mass storage media interface emulator 50 uses this signal to indicate to the media controller 22 that it is busy processing and is unable to accept new commands or the data is not yet ready. Additionally the mass storage media interface emulator 50 can present identification bytes to the media controller 22 which indicates the NAND Flash devices are larger than they actually are. The command buffer and sequencer 58 can interpret larger addresses provided by the media controller 22 and use them to select other devices in the mass storage media 26. This removes the requirement of a strict 1-to-1 mapping between what the media controller 22 interprets the mass storage media 26 to be and the actual implementation of the mass storage media 26.

The media controller interface emulator 56 of the crypto subsystem emulator 102 presents an interface to the mass storage media 26 that is identical to the Toshiba TC58NC353F High Capacity Flash Disk Controller. In certain systems it is preferable for the command buffer and sequencer to interpret addresses provided by the media controller 22 and re-map them into the actual physical implementation of the mass storage media 26 to enhance or augment the capabilities of the devices comprising the mass storage media 26. This allows a given media controller 22 to control more devices in the mass storage media 26 by the media controller interface emulator 56 representing to the media controller 22 that it consists of a fewer number of larger devices than are actually implemented in the mass storage media 26. This also allows a given media controller 22 to control larger devices in the mass storage media 26 than it was otherwise capable of supporting by the media controller interface emulator 56 representing to the media controller 22 that it consists of a larger number of smaller devices than are actually implemented in the mass storage media 26.

Crypto key information resides in the MCU 92 in two separate key components. One component, the manufacturing key (MFG-Key) is a unique key programmed in the MCU 92 at the time of manufacture. The other key component, the organization key (ORG-key) is programmed by the organization responsible for the card before formatting or adding users to the card. This key component is managed by the organization responsible for the card. Both key components are write-only and must not be read-out of the MCU 92. The actual crypto key provided to the encryption/decryption 28 unit is a hash (one-way function) of the MFG-Key and the ORG-Key. Using a hash, such as the SHA-1 algorithm precludes any single entity from knowing the actual crypto key information for the card. It also allows an organization to have a single ORG-Key for all of its secure data storage devices, yet still have unique crypto key information for each individual secure data storage device. This ensures that just because one of the secure data storage devices were compromised and the crypto key information determined, none of the other secure data storage devices would be compromised or otherwise affected as there is very little additional information learned from compromising the crypto key information of one secure data storage device.

In order to provide controlled access to multiple users, the user authentication 30 unit contains parameters and lists of users and their privileges. The parameters include an attack count for monitoring unsuccessful login attempts and an ID and PIN code or password for the Security Officer (SO) responsible for managing the card, and lists including the user ID, user PIN code or password, and access privileges (none, read or read/write) and an attempt count for each user ID. By supporting multiple user ID's a single secure data storage device containing confidential data can be used by multiple users without fear of compromising a single PIN code or password. By supporting an SO, card configuration, applicable users and other parameters can be managed on a card-by-card basis within the organization. This is essential in organizations where the secure data storage device and hence the data are not assigned to an individual, but must be available for a group. Each user is capable of changing their own PIN code or password, but only the SO is capable of creating a user or changing any PIN code or password.

Using the keypad 90, a user first presses the key labeled "*" which serves to wake up the MCU 92 and indicate a user ID is being entered. The user enters their ID via the numbers of the keypad and presses the "#" key to indicate the end of the user ID. The user then enters their PIN code or password on the number keys, terminated again by the "#" key. Once the entire key sequence is completed, the MCU 92 matches the user ID and PIN code, or password with the one stored in the internal list. If the user ID and PIN code or password match, the appropriate crypto key information is transferred to the encryption/decryption 28 unit and the attack count and attempt count for the user ID is cleared. If the user ID and PIN code or password do not match, the attempt count for the user ID is incremented if the user ID is valid, otherwise an attack count is incremented. If the attempt count exceeds a threshold predetermined by the SO, the user is locked out of the card until the SO re-enables the user. If the attack count reaches a threshold predetermined by the SO, all users for the secure data storage device are locked, out until the SO re-enables the users. If unsuccessful attempts at login as the SO exceed a predetermined threshold, all access to the card is blocked and the SO defined portion of the crypt key information is deleted or "zeroized".

A given secure data storage device is organized into one or more logical partitions. Each partition is uniquely identified by the physical mapping in the communication between the media controller 22 and the mass storage media 26 by examining information such as address, block address or head/servo control. One of the components of the list of users and their privileges is the physical mapping of the partition the privileges apply to. In this manner, not only can multiple users have access to the same secure data storage device, but a given user can have access controlled down to a partition level. This method allows for a partition that has programs or other information that is accessible by any user on one partition, confidential random access data that is read/write accessible by one group of users, and confidential data that is read-only to most users, but may be written by a few users. All of this in the same secure data storage device, without the overhead of extra programs on the host computer or leaving the data susceptible to attack.

There are user authentication devices which require more computing power than would be available within the power and form-factor requirements of a PCMCIA Card. An example of this type of authentication device would be a fingerprint sensor. While it is relatively simple to acquire the fingerprint image from a fingerprint image sensor, such as the Authentec AES4000 fingerprint sensor integrated circuit, actually using it to authenticate the user is very complex. Once the fingerprint image is acquired, a complicated algorithm is required to identify and extract the fingerprint minutiae or other items of interest, and create a unique feature vector to identify the user. This requires processing power equivalent to a 200 Mhz Pentium II processor to perform the feature extraction and vector creation in a timely manner. Once the feature vector has been created, an on-board microcontroller or DSP could be used to perform the matching function with stored reference feature vectors that represent users. Other more complicated user authentication methods include face recognition and iris (eye) pattern matching. These methods require a compute intensive pattern extraction algorithm to provide a feature vector which could be used to match with already established users.

Figure 7:
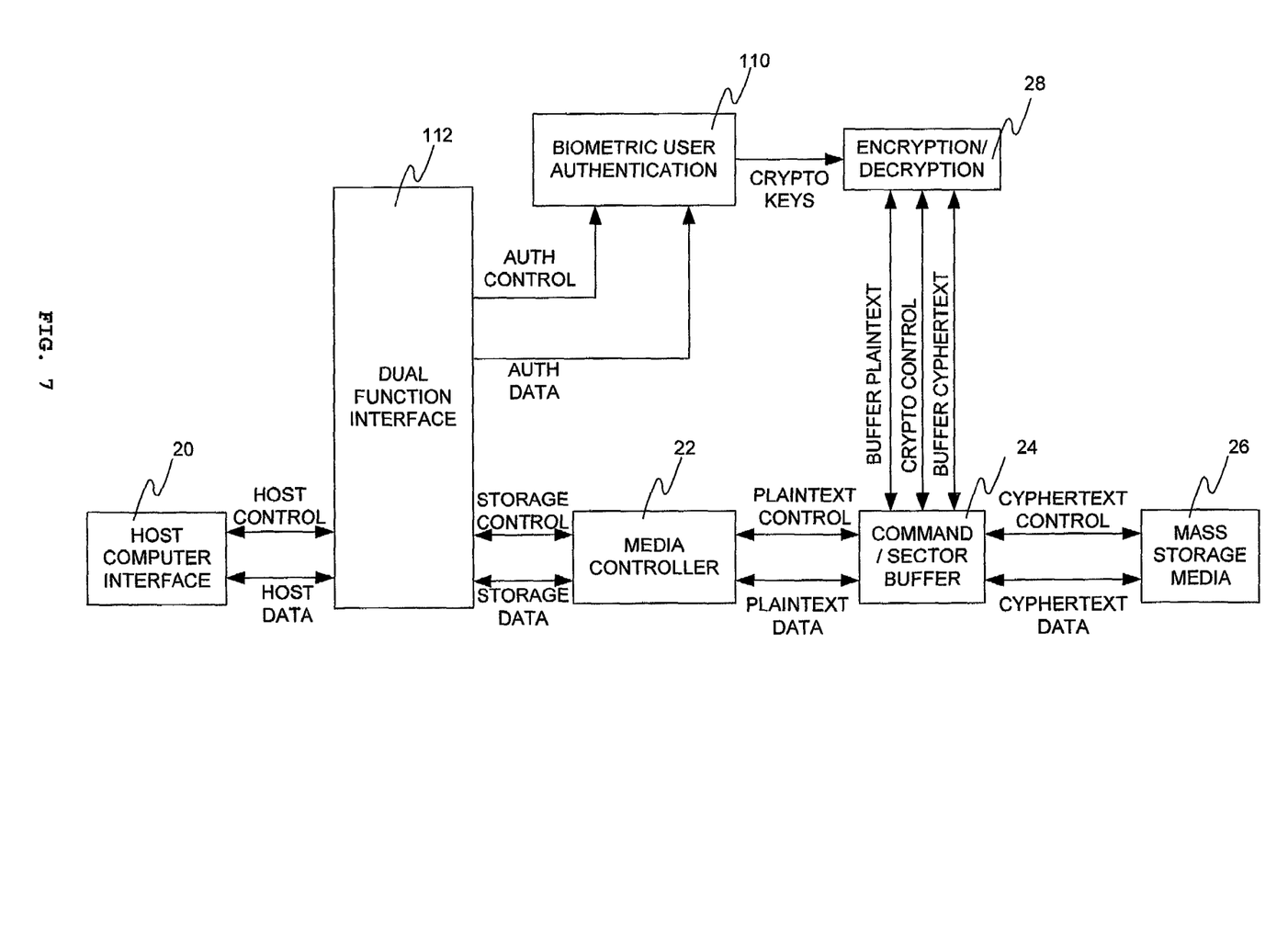
FIG. 7 is a block diagram of the present invention with biometric user authentication.

While the mechanism for providing information between the host computer and the MCU 92 as outlined previously can be used to transfer data to the host for complex processing, it may not be simple for the host computer to implement the changes to the mass storage device driver permitting the large amounts of data being transferred. FIG. 7 shows a block diagram of the architecture which is capable of not only providing on-the-fly data encryption, but is also capable of using the host computer for more complex user authentication algorithms. A dual function interface 112 is provided between the host computer interface 20 and the media controller 22 to allow the host computer to access the biometric user authentication 110 unit as well. The dual function interface 112 provides the additional CIS (Card Information Structure) and separate configuration registers required for a PCMCIA Multiple Function PC Card as defined in the PCMCIA PC Card Standard 1997 Electrical Specification published by the Personal Computer Memory Card International Association (PCMCIA) 2635 North First St, Suite 209, San Jose, Calif. 95134 USA. The Multiple Function PC Card implementation allows the media controller 22 to maintain and use its interface to the host computer without requiring additional coding of the software driver or hardware changes to the media controller 22. The dual function interface 112 provides the CIS describing the biometric function and linking the CIS provided by the media controller 22 as well as the Configuration Registers and interface for the biometric user authentication 110.

A biometric user authentication 110 module receives authentication control (auth control) and authentication data (auth data) from the dual function interface 112. Examples of biometric user authentication schemes include fingerprints, Iris patterns of the eye, facial features and other biologically related features. The biometric user authentication 110 module provides the fingerprint image data to the host computer and receives the extracted feature vector once the host computer has finished processing. The fingerprint image data is preferably signed and optionally encrypted to prevent simple replay attacks on the biometric user authentication 110 module. The incoming extracted feature vector is also signed and optionally encrypted and the extracted feature vector is checked to see that the values presented were extracted from the image provided, before providing attempting to authenticate the user. Once the feature vector is determined to be from the provided fingerprint image, the biometric user authentication attempts to match the feature vector with a list of users previously stored in the biometric user authentication 110 module. If it is determined that the extracted feature vector sufficiently matches a stored user, the user privileges and crypto keys are provided to the encryption/decryption 28 unit for operation on the buffer plaintext and buffer cyphertext data.

Figure 8:
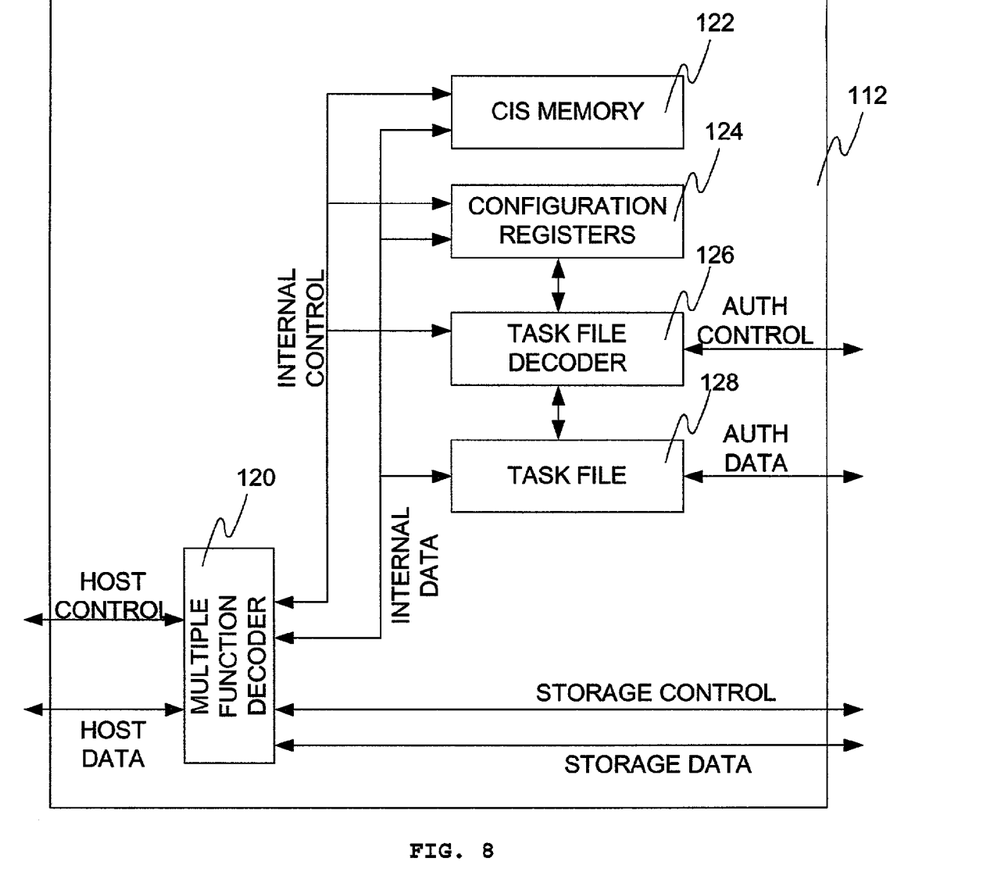
FIG. 8 is a block diagram of the dual function interface.

Further detail of the dual function interface 112 is provided in FIG. 8. A multiple function decoder 120 receives host control and host data information and provides the appropriate storage control and storage data or internal control and internal data depending on which device the host information is appropriate to. CIS memory 122 contains the PCMCIA standard tuples describing the interface for the biometric user authentication 110 module. The preferred embodiment of the interface for the biometric user authentication 110 module is a task file 128. The task file 128 is implemented as a dual-port memory with the host computer having access to one port over the internal data bus and the biometric user authentication 110 module having access to the other port over the auth data bus. Configuration registers 124 are provided for the host computer to use to enable and disable the task file interface as well as to define the valid address ranges of the task file 128. Further description of the PC Card standard configuration registers is available in the PC Card Standard 1997 Electrical Specification. The task file decoder 126 uses the internal control bus as well as the auth control bus and configuration information from the configuration registers 124 to determine address for and access to the task file 128. This implementation provides a simple I/O mapped or memory mapped interface between the host, computer and the biometric user authentication 110 module.

Figure 9:
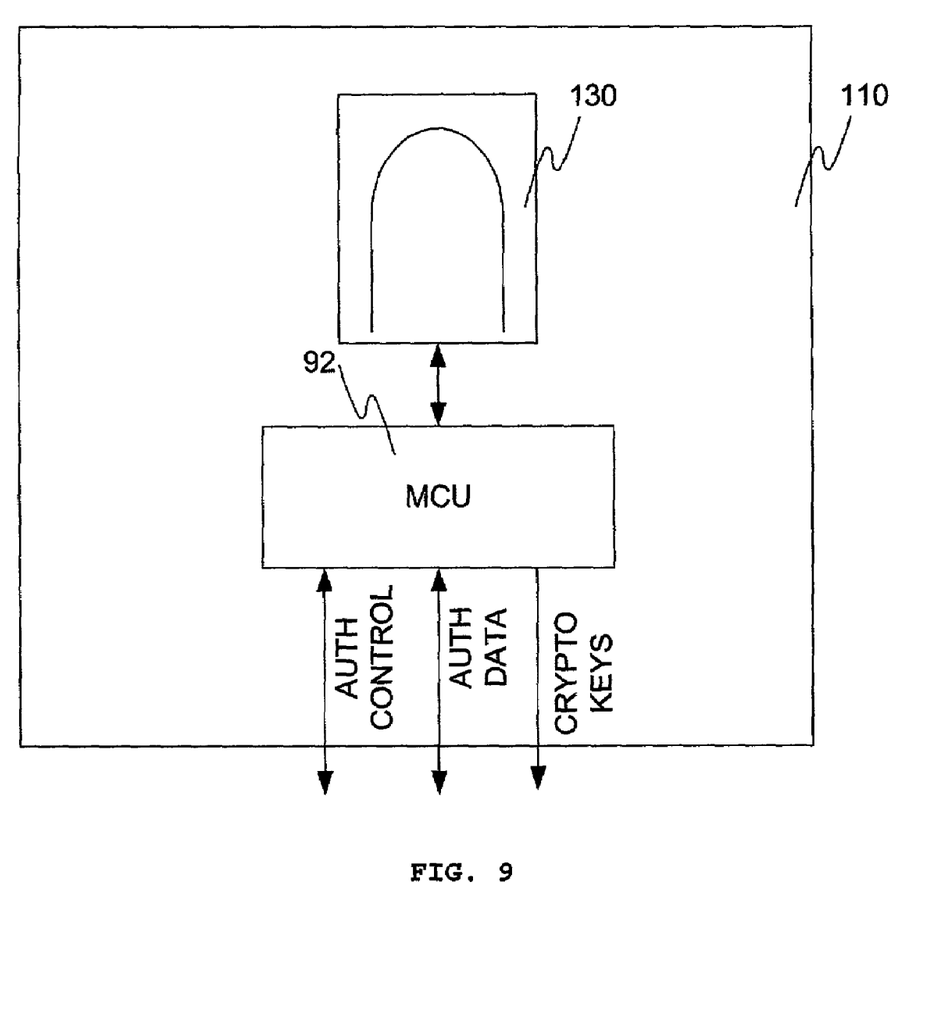
FIG. 9 is a block diagram of a biometric user authentication module.

FIG. 9 shows a block diagram of a fingerprint oriented biometric user authentication module 110. An MCU 92 interfaces to the dual function interface 112 over the auth control and auth data busses. The MCU 92 can be a microcontroller such as the Atmel AT90LS8535 8-bit RISC microcontroller, or a DSP such as the Texas Instruments TMS320VC5502 Digital Signal Processor. The choice of the MCU 92 depends on how much image enhancement on the fingerprint image needs to be done before providing the image to the host computer. A fingerprint sensor 130 such as the Authentec AES4000 fingerprint sensor integrated circuit receives its commands and provides fingerprint image data to the MCU 92. After receiving the extracted feature vector and ensuring that it was generated from the fingerprint image provided, the MCU 92 matches the extracted feature vector with the feature vectors of known users. If the extracted feature vector matches the feature vector of a known user, the crypto keys for the data are provided to the encryption/decryption 28 unit for operation on the buffer plaintext and buffer cyphertext. In the case of the fingerprint sensor 130, no battery is needed for the MCU 92 because the fingerprint can not be validated without the active participation of the host computer.

Figure 10:
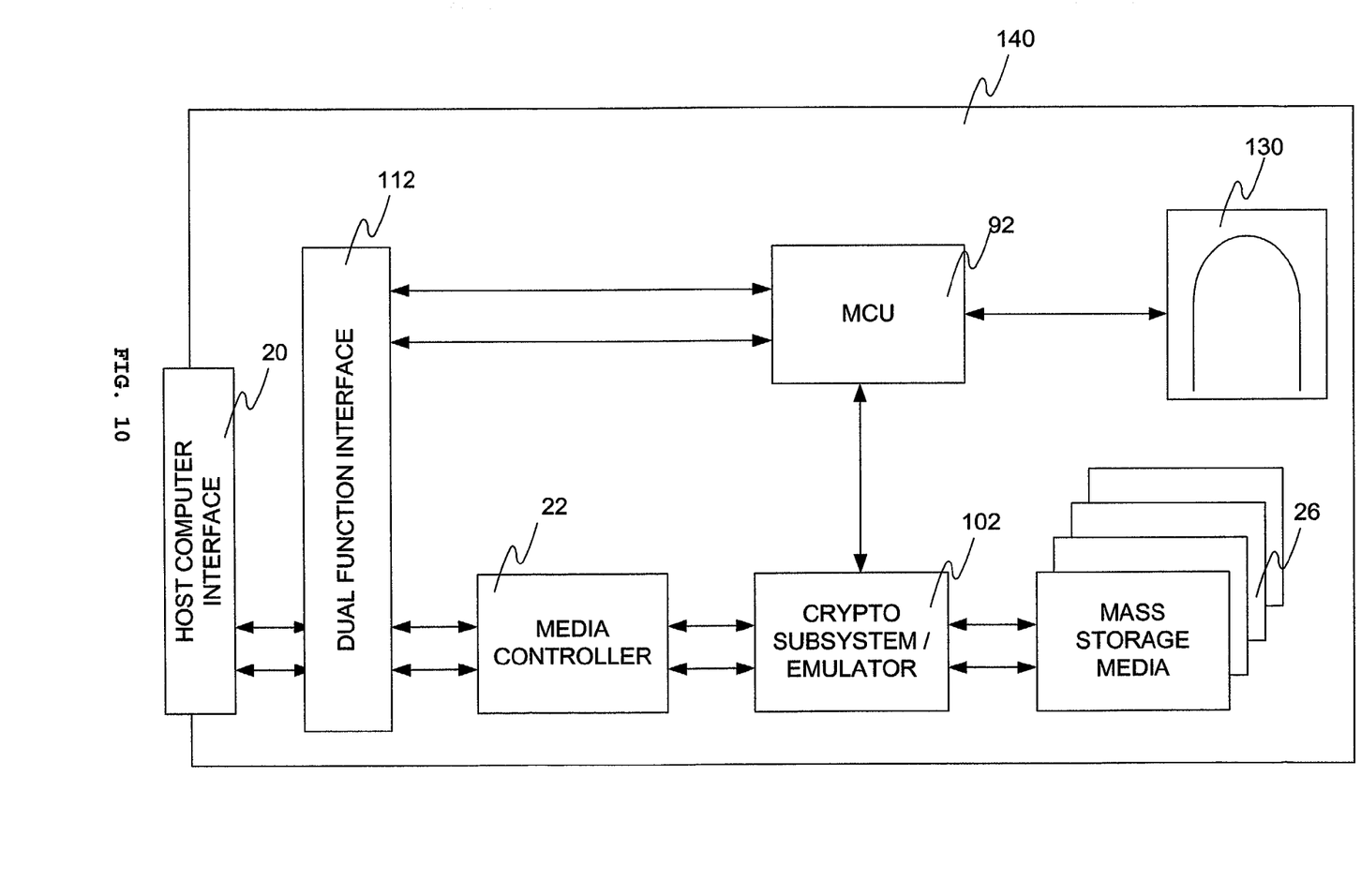
FIG. 10 is a block diagram of a PC Card with fingerprint user authentication.

FIG. 10 shows a block diagram of a PC Card with the fingerprint user authentication. For systems requiring additional density, the dual function interface 112 and the crypto subsystem/emulator 102 can be combined in the same ASIC device. This single device, although having a higher pin count, would reduce the overall area required for the solution over mass storage devices not having encryption or user authentication integrated.

In another embodiment, for healthcare applications, there is no explicit need for the keypad 90. The Secure Data Storage device is connected to a handheld computer for managing patient records. Current HIPAA requirements for patient privacy require that the patient records be access restricted. The use of multiple, distinct user ID and password allows different users, or groups of users such as doctors, nurses, attendants, etc. to have unique passwords. Along with the unique passwords, each user or group has restricted access to various partitions of the storage media which controls the information available to the user based on their function in the healthcare environment. With both the handheld computer and the Secure Data Storage device being portable it is imperative that the data be protected against an opponent actually having access to the entire handheld computer and Secure Data Storage device.

The specific implementation described above illustrates the preferred embodiment of the invention. It will be apparent to those skilled in the art that numerous changes or modifications may be made to the methods and apparatus described without departing from the true spirit and scope of the invention. Such changes or modifications are to be understood as included within the scope of the present invention as defined by the appended claims unless they depart therefrom.

What is claimed is:

1. A secure mass data storage device operable in conjunction with a host computer, comprising:
   a mass storage media;
   a command/sector buffer in cyphertext control communication and cyphertext data communication with the mass storage media;
   an encryption/decryption unit in control communication and data communication with the command/sector buffer;
   a user authentication unit operable to provide a cryptokey and in cryptokey communication to the encryption/decryption unit;
   a media controller in plaintext control communication and plaintext data communication with the command/sector buffer; and
   a host computer interface in plaintext control communication and plaintext data communication with the media controller, wherein the cryptokey communication of the user authentication unit to the encryption/decryption unit does not pass through the host computer interface.

2. The secure mass data storage device of claim 1, wherein the mass storage media, the command/sector buffer, the encryption/decryption unit, the user authentication unit, the media controller, and the host computer interface are mounted on a single support card.

3. The secure mass data storage device of claim 1, wherein the mass storage media, the command/sector buffer, the encryption/decryption unit, the user authentication unit, the media controller, and the host computer interface are mounted on a support card selected from the group consisting of a PCMCIA support card and a Compact Flash.

4. The secure mass data storage device of claim 1, wherein the mass storage media, the command/sector buffer, the encryption/decryption unit, the user authentication unit, the media controller, and the host computer interface are supported on a single support card that may be connected to the host computer through an externally accessible connector of the host computer.

5. The secure mass data storage device of claim 1, wherein the user authentication unit comprises an externally physically accessible personal identification input device.

6. The secure mass data storage device of claim 1, wherein the user authentication unit comprises an externally physically accessible personal identification input device selected from the group consisting of a keyed input device and a biometric sensor.

7. The secure mass data storage device of claim 1, wherein the user authentication unit is not a part of the host computer.

8. The secure mass data storage device of claim 1, wherein the user authentication unit receives personal identification input from a user of the secure mass data storage device, and wherein no personal identification input is communicated through the host computer interface.

9. The secure mass data storage device of claim 1, wherein the encryption/decryption unit is not a part of the host customer.

10. The secure mass data storage device of claim 1, wherein the command/sector buffer and the encryption/decryption unit are implemented as a crypto/system emulator.

11. The secure mass data storage device of claim 1, wherein the user authentication unit is in data communication with the command/sector buffer and with the encryption/decryption unit.

12. The secure mass data storage device of claim 1, wherein the cryptokey comprises two key components, including a user-selected key component and a manufactured key component.

13. The secure mass data storage device of claim 1, wherein the user authentication unit comprises a user privilege list.

14. A secure mass data storage device operable in conjunction with a host computer, comprising:
   a mass storage media;
   a command/sector buffer in cyphertext control communication and cyphertext data communication with the mass storage media;
   an encryption/decryption unit in control communication and data communication with the command/sector buffer, wherein the encryption/decryption unit is not a part of the host;
   a user authentication unit operable to provide a cryptokey and in cryptokey communication to the encryption/decryption unit, wherein the user authentication unit is not a part of the host;
   a media controller in plaintext control communication and plaintext data communication with the command/sector buffer; and
   a host computer interface in plaintext control communication and plaintext data communication with the media controller, wherein the cryptokey communication of the user authentication unit to the encryption/decryption unit does not pass through the host computer interface,
wherein the mass storage media, the command/sector buffer, the encryption/decryption unit, the user authentication unit, the media controller, and the host computer interface are mounted on a single support card that may be connected to the host computer through an externally accessible connector of the host computer.

15. The secure mass data storage device of claim 14, wherein the user authentication unit includes an externally physically accessible personal identification input device.

16. The secure mass data storage device of claim 14, wherein the command/sector buffer comprises a crypto subsystem/emulator.

17. The secure mass data storage device of claim 14, wherein the cryptokey comprises two key components, including a user-selected key component and a manufactured key component.

18. The secure mass data storage device of claim 14, wherein the user authentication unit includes a user privilege list.

19. A method for retrieving information stored on a secure mass data storage device under control of a user, comprising the steps of:

providing the secure mass data storage device operable in conjunction with a host computer and comprising
- a mass storage media,
- a command/sector buffer in cyphertext control communication and cyphertext data communication with the mass storage media,
- an encryption/decryption unit in control communication and data communication with the command/sector buffer,
- a user authentication unit operable to provide a cryptokey and in cryptokey communication to the encryption/decryption unit,
- a media controller in plaintext control communication and plaintext data communication with the command/sector buffer, and
- a host computer interface in plaintext control communication and plaintext data communication with the media controller, wherein the cryptokey communication of the user authentication unit to the encryption/decryption unit does not pass through the host computer interface;

the user providing a personal identification input to the user authentication unit;

the user authentication unit providing a cryptokey to the encryption/decryption unit;

the command/sector buffer retrieving data in cyphertext form from the mass storage media and deencrypting the data to plaintext data with the encryption/decryption unit using the cryptokey; and the command/sector buffer supplying the plaintext data to the host computer.

20. The method of claim 19, wherein the mass storage media, the command/sector buffer, the encryption/decryption unit, the user authentication unit, the media controller, and the host computer interface are mounted on a single support card, and wherein the step of the user providing the personal identification input includes the step of providing the personal identification input to the user authentication unit when the host computer interface is not in communication with the host computer, and wherein the method includes the additional step, after the step of the user providing the personal identification input, of placing the host computer interface into communication with the host computer.

* * * * *

UNITED STATES PATENT AND TRADEMARK OFFICE
Certificate

Patent No. 7,069,447 B1                                                      Patented: June 27, 2006

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Rodney Loe Corder, Chesteron, IN (US); and James E. Shea, Ellicott City, MD (US).

Signed and Sealed this Twenty-ninth Day of December 2009.

TODD SWANN
*Supervisory Patent Examiner*
Art Unit 2400